US010597055B2

(12) United States Patent
Paden et al.

(10) Patent No.: US 10,597,055 B2
(45) Date of Patent: Mar. 24, 2020

(54) LOCOMOTIVE CONTROL NETWORKS

(71) Applicant: Methode Electronics, Inc., Carthage, IL (US)

(72) Inventors: David M. Paden, Centerville, OH (US); Kerry L. Greer, Melbourne Beach, FL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 14/929,760

(22) Filed: Nov. 2, 2015

(65) Prior Publication Data

US 2017/0120939 A1   May 4, 2017

(51) Int. Cl.
*B61L 27/00* (2006.01)
*B61L 3/12* (2006.01)
*B61L 15/00* (2006.01)
*B61L 17/00* (2006.01)
(Continued)

(52) U.S. Cl.
CPC .............. *B61L 27/00* (2013.01); *B61L 3/127* (2013.01); *B61L 15/0027* (2013.01); *B61L 17/00* (2013.01); *B61L 27/0005* (2013.01); *G05D 1/0022* (2013.01); *H04B 17/318* (2015.01)

(58) Field of Classification Search
CPC ...... B61L 27/00; B61L 27/0005; B61L 3/127; B61L 15/0027; B61L 17/00; G05D 1/0022; H04B 17/318
See application file for complete search history.

(56) References Cited

U.S. PATENT DOCUMENTS

| 5,941,921 A | 8/1999 | Dasys et al. |
| 6,449,536 B1 | 9/2002 | Brousseau et al. |
| 6,466,847 B1 | 10/2002 | Horst |

(Continued)

FOREIGN PATENT DOCUMENTS

| EP | 2925073 | 9/2015 |
| EP | 2925073 A1 | 9/2015 |

OTHER PUBLICATIONS

International Search Report dated Dec. 13, 2016; International Application No. PCT/US2016/048618; International Filing Date Aug. 25, 2016; 3 pages.

(Continued)

*Primary Examiner* — Omar J Ghowrwal
(74) *Attorney, Agent, or Firm* — Blank Rome LLP

(57) ABSTRACT

A system and method for controlling locomotives. The system includes a remote control unit (RCU) comprising a processing device and a computer-readable storage medium and a locomotive control unit (LCU) comprising a processing device and a computer-readable storage medium. The LCU is coupled to a locomotive control system of a locomotive for controlling the locomotive and acquiring data therefrom. The LCU is configured for listening to a common radio-frequency channel for a transmission by a network node, waiting for the channel to become free, and transmitting a message after the channel has become free. The RCU is configured for listening to a common radio-frequency channel for a transmission by a network node, waiting for the channel to become free, and transmitting a message after the channel has become free. The system may include one or more repeaters for extending an operational area of the system.

21 Claims, 5 Drawing Sheets

(51) Int. Cl.
*G05D 1/00* (2006.01)
*H04B 17/318* (2015.01)

(56) References Cited

U.S. PATENT DOCUMENTS

| | | |
|---|---|---|
| 6,470,245 B1 | 10/2002 | Proulx |
| 6,658,331 B2 | 12/2003 | Horst et al. |
| 6,691,005 B2 | 2/2004 | Proulx |
| 6,693,584 B2 | 2/2004 | Horst et al. |
| 6,697,716 B2 | 2/2004 | Horst |
| 6,789,004 B2 | 9/2004 | Brousseau et al. |
| 6,799,098 B2 | 9/2004 | Horst et al. |
| 6,834,219 B2 | 12/2004 | Proulx |
| 6,853,890 B1 | 2/2005 | Horst et al. |
| 6,854,691 B2 | 2/2005 | Kraeling et al. |
| 6,862,502 B2 | 3/2005 | Peitz et al. |
| 6,863,247 B2 | 3/2005 | Horst |
| 6,928,342 B2 | 8/2005 | Horst |
| 6,975,927 B2 | 12/2005 | Szklar et al. |
| 7,069,122 B1 | 6/2006 | Higgs |
| 7,076,343 B2 | 7/2006 | Kornick et al. |
| 7,126,985 B2 | 10/2006 | Horst et al. |
| 7,131,614 B2 | 11/2006 | Kisak et al. |
| 7,164,709 B2 | 1/2007 | Horst et al. |
| 7,167,510 B2 | 1/2007 | Horst et al. |
| 7,203,228 B2 | 4/2007 | Horst et al. |
| 7,233,844 B2 | 6/2007 | Peitz et al. |
| 7,236,859 B2 | 6/2007 | Horst et al. |
| 7,257,471 B2 | 8/2007 | Kornick et al. |
| 7,484,169 B2 | 1/2009 | Hrebek et al. |
| 7,494,194 B2 | 2/2009 | Higgs et al. |
| 7,520,472 B2 | 4/2009 | Peitz et al. |
| 7,529,201 B2 | 5/2009 | Aiken, II et al. |
| 7,535,865 B2 | 5/2009 | Aiken, II et al. |
| 7,653,465 B1 | 1/2010 | Geiger et al. |
| 7,688,218 B2 | 3/2010 | LeFebvre et al. |
| 7,792,089 B2 | 9/2010 | Aiken, II et al. |
| 8,019,496 B2 | 9/2011 | Matusiak, Jr. et al. |
| 8,050,809 B2 | 11/2011 | Geiger et al. |
| 8,212,685 B2 | 7/2012 | LeFebvre et al. |
| 8,280,567 B2 | 10/2012 | Brand et al. |
| 8,358,194 B2 | 1/2013 | Baravalle |
| 8,380,361 B2 | 2/2013 | Evans |
| 8,386,281 B2 | 2/2013 | Goodermuth et al. |
| 8,406,943 B2 | 3/2013 | Brand et al. |
| 8,532,842 B2 | 9/2013 | Smith et al. |
| 8,649,916 B2 | 2/2014 | Woo et al. |
| 8,823,537 B2 | 9/2014 | LeFebvre et al. |
| 9,145,863 B2 | 9/2015 | Melster et al. |
| 2004/0120305 A1 | 6/2004 | Aiken, II et al. |
| 2010/0168941 A1 | 7/2010 | Geiger et al. |
| 2013/0066490 A1 | 3/2013 | Liberatore |
| 2013/0107813 A1 | 5/2013 | Siriwongpaiat et al. |
| 2013/0265884 A1* | 10/2013 | Brombal ............. H04W 76/027 370/242 |
| 2014/0076031 A1 | 3/2014 | Fugiel et al. |
| 2014/0111321 A1 | 4/2014 | Fox |
| 2014/0239127 A1 | 8/2014 | Morris |
| 2014/0277845 A1 | 9/2014 | Paulino et al. |
| 2014/0277850 A1 | 9/2014 | Jobs et al. |
| 2015/0045993 A1 | 2/2015 | Cooper et al. |
| 2015/0083869 A1 | 3/2015 | LeFebvre et al. |
| 2015/0134147 A1 | 5/2015 | Woo et al. |
| 2015/0229340 A1* | 8/2015 | Liu ...................... H04L 1/0057 375/240.27 |

OTHER PUBLICATIONS

Written Opinion dated Dec. 13, 2016; International Application No. PCT/US2016/048618; International Filing Date Aug. 25, 2016; 7 pages.
International Preliminary Report on Patentability dated May 8, 2018; International Application No. PCT/US2016/048618; International Filing Date: Aug. 25, 2016; 8 pages.
Australia Examination Report No. 1 dated Nov. 28, 2018; corresponding Australia Patent Application No. 2016348358; having International Filing Date: Aug. 25, 2016; 5 pages.
Russian Office Action dated May 7, 2019; Russian Application No. 2018118840; 7 pages.
English translation; Russian Office Action dated May 7, 2019; Russian Application No. 2018118840; 2 pages.
Extended European Search Report dated May 14, 2018; European Application No. 16862639.8; Filing Date: Aug. 25, 2016; 6 pages.

* cited by examiner

LOCOMOTIVE CONTROL NETWORKS

FIELD OF THE INVENTION

The present invention relates to a method and system for increased spectral efficiency in wireless locomotive remote control and, more specifically, to a system and method by which a wireless railroad remote control system communicates using a common channel and manages access to the channel using collision avoidance.

BACKGROUND OF THE INVENTION

In a large commercial class 1 railway switching yard, many trains operate within the same confined geographic area on closely-laid parallel tracks. In order for the operators of the railway switching yard to quickly couple and uncouple various cargo cars on a given train, a wireless radio remote control using radio frequency (RF) communications is used to move a locomotive back and forth to facilitate switching. The yard can be over two miles in length, and the wireless radio remote control communications are required to cover the entire area.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

Figure 1A:
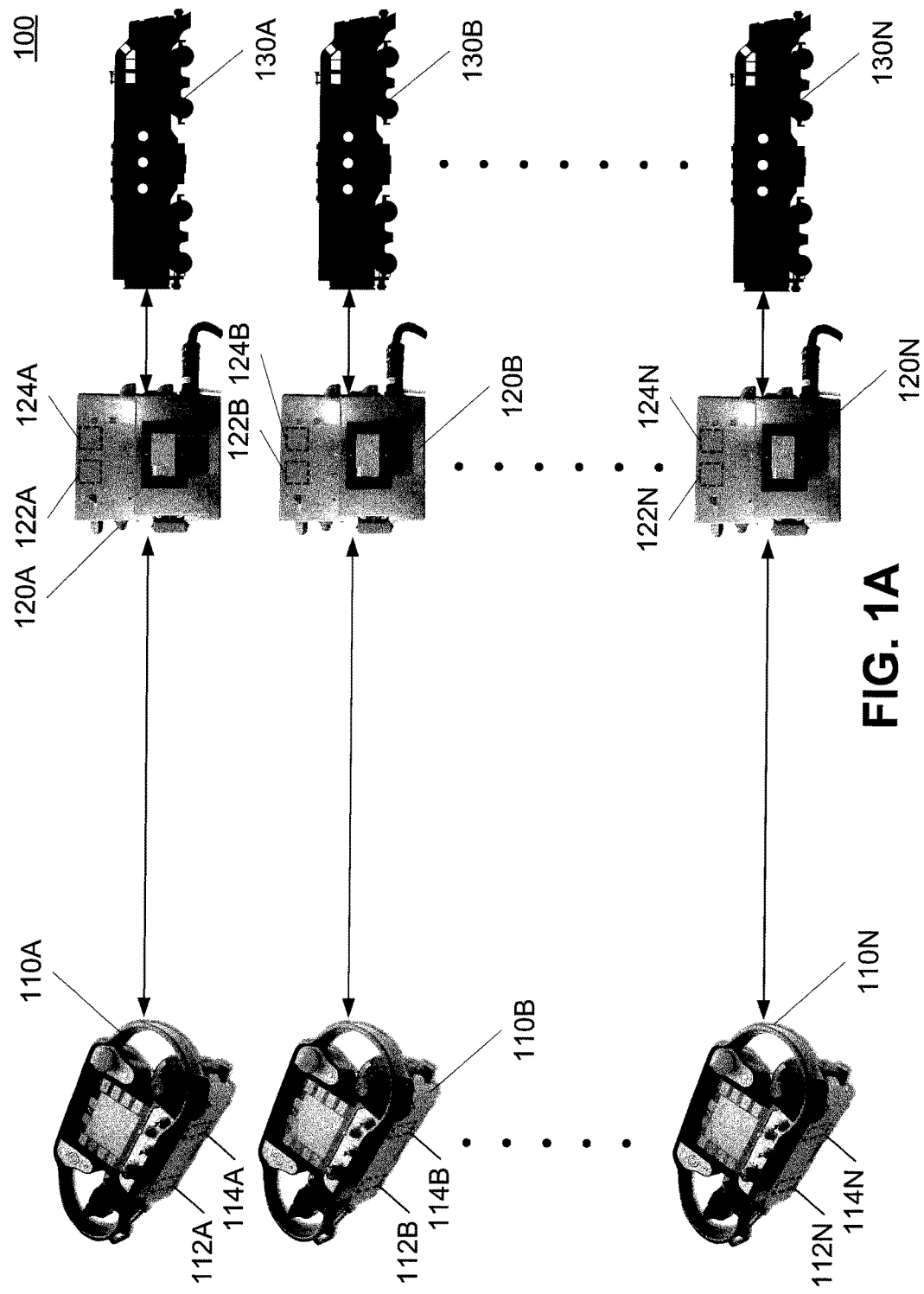
FIG. 1A illustrates a first embodiment of a railroad remote control system, in accordance with an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

The close geographic area of railway switching yard creates a problem for RF spectrum management with multiple trains, each having a locomotive controlled by a wireless radio remote control unit. In an example of a conventional wireless control system, each locomotive is assigned a unique RF channel in a Frequency Division Multiple Access (FDMA) network topology. The conventional FDMA network topology is limited by available spectra. Specifically, as rail yards grow in size, the available spectra for the conventional FDMA network topology limits the number of unique frequency channels to assign to each locomotive. When an RF repeater network is utilized to extend the operational range beyond two miles, each repeater requires its own channel, thereby limiting the number of channels available for assigning to locomotives. Assigning a unique channel to each locomotive and to each repeater results in wasted bandwidth in a conventional FDMA network, as each device does not constantly transmit commands and data. The amount of time during which a locomotive and a repeater does not transmit may be significant and results in wasted bandwidth.

Recent improvements in wireless radio remote control of locomotives have used Time Division Multiple Access (TDMA) to control access to available spectra. In TDMA each channel is divided into multiple timeslots, each of which is assigned to a locomotive for transmitting data. Multiple locomotives share a common RF channel. However, this technique does not allow for variable-length messages or, more specifically, variable-length time slots. As a result, timeslot lengths are chosen to accommodate the longest message (e.g., measured in time required to transmit all message bytes) that may be transmitted. When a message having a length less than the maximum afforded by the time slot is sent, the channel is idle following the end of the message until the end of the timeslot is reached. This idle period results in wasted bandwidth.

An exemplary embodiment of the present invention reduces the amount of time during which an RF channel is idle during routine communications over that found in FDMA and TDMA topologies. Such exemplary embodiment uses a Carrier Sense Multiple Access (CSMA) topology, in which each transmitter shares a common RF channel. Each transmitter transmits for the minimum duration necessary for its specific message. Additionally, a Collision Avoidance (CA) algorithm is utilized to arbitrate between inevitable collisions. CSMA with CA (hereafter referred to as "CSMA/CA") techniques provide for very efficient spectral usage of a shared RF channel.

Referring now to FIG. 1A, there is illustrated a railroad remote control system, generally designated as 100, in accordance with an exemplary embodiment of the present invention. The system 100 comprises a plurality of remote control units, also referred to as "operator control units" (OCUs), 110A, 110B, . . . , 110N communicating over a common RF channel with a plurality of locomotive control units (LCUs) 120A, 120B, . . . , 120N connected, respectively, to locomotives 130A, 130B, . . . , 130N and specifically to a respective locomotive control system thereof. In the exemplary embodiment of the system 100 illustrated in FIG. 1, the OCUs 110A, 110B, . . . , 110N communicate directly with respective ones of the LCUs 120A, 120B, . . . , 120N.

Each device 110, 120 (the OCUs 110A, 110B, . . . , 110N and the LCUs 120A, 120B, . . . , 120N) in the system 100 is a network node. Each node monitors its inputs (e.g. each OCU 110 monitors its operator controls and each LCU 120 monitors feedback for its respective locomotive 130A, 130B, . . . , 130N). Each node transmits packets comprising any changed data or control information. If no data or control information has changed within a pre-configured heartbeat interval, the node transmits a heartbeat packet which indicates that no data and control information has changed since the last transmission by the node.

All packets transmitted by nodes include the following fields: a preamble, a sync word sequence, a length indication, heartbeat status bits (start and stop status), a source node ID identifying the transmitting node, a destination node ID identifying the receiving node or nodes, link status, node/device type (unknown, LCU, OCU, repeater), a sequence number, and a checksum (e.g., CRC-16). Messages including commands or data further include a command payload comprising one or more commands identified by one or more respective command IDs. Heartbeat messages include all of the foregoing fields, except for the command payload. Thus, a heartbeat message is identified by the fact that it includes no command payload.

Commands are variable in length, depending on the command type and the amount of data in the payload. Messages also vary in length depending on the amount of data in their payload. A single message (packet) may contain any number of command IDs and any amount of data in the command payload, so long as the total message size does not exceed the message size limit. In an exemplary embodiment, the message size limit is 36 bytes and the overhead of the packet (all of the foregoing fields minus the command ID and the payload) is 11 bytes, and the packet further includes a four-bit preamble. The shortest messages are heartbeat messages, which are 11 bytes (the overhead) plus the four-bit preamble. The longest messages are 36 bytes plus 4-bits for the preamble.

Each OCU 110A, 110B, . . . , 110N is assigned an address or identifier (ID) that uniquely identifies the OCU 110 from all other OCUs 110 and LCUs 120. Each LCU is also assigned an address (ID) that uniquely identifies the LCU 120 from all other LCUs 120 and OCUs 110. The source node ID in a packet is either an OCU 110 ID or an LCU 120 ID. The destination node ID in a packet is either an OCU 110 ID or and LCU 120 ID. The payload comprises changed data and/or changed control information.

Figure 1B:
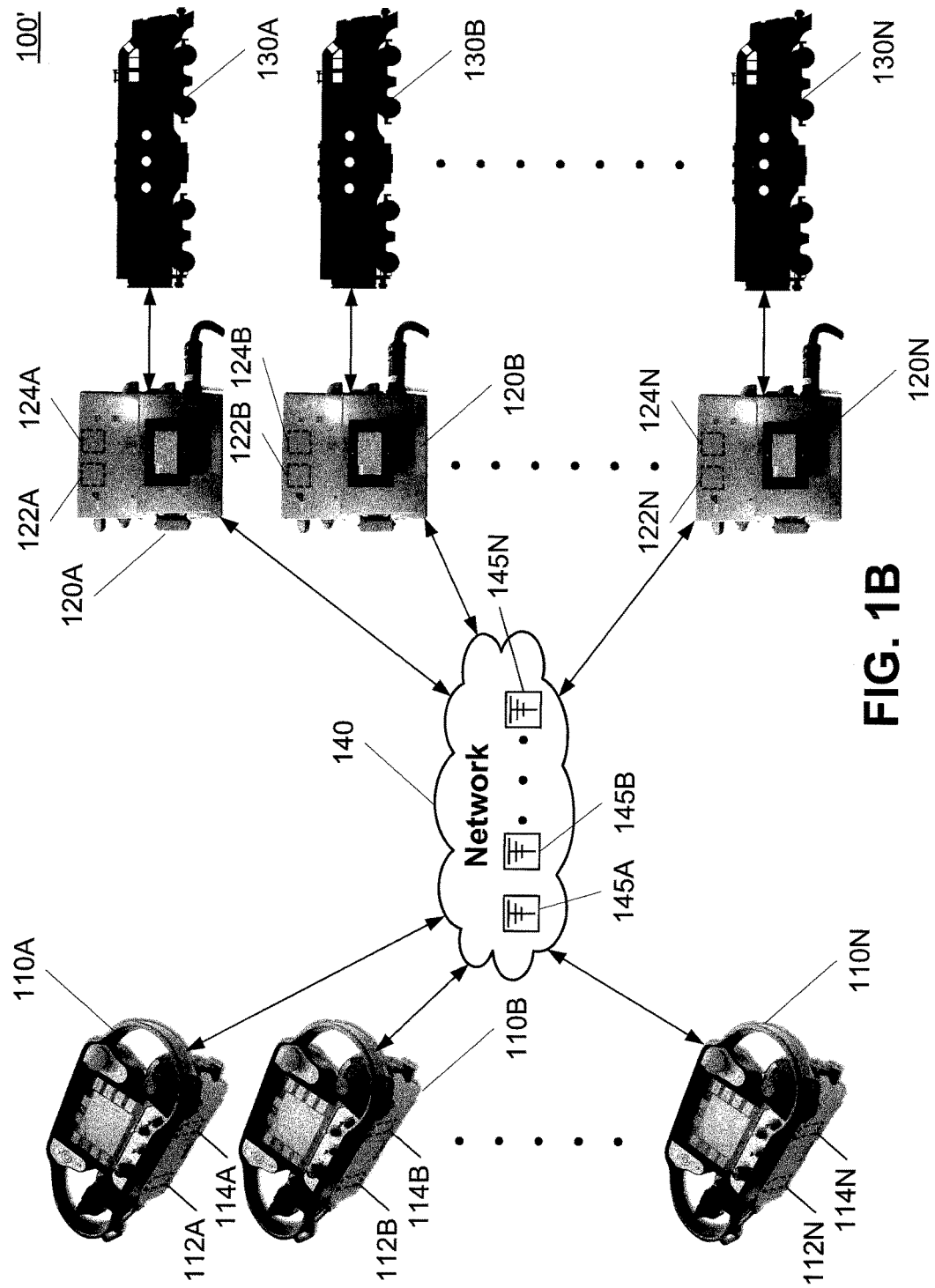
FIG. 1B illustrates a second embodiment of a railroad remote control system, in accordance with an exemplary embodiment of the present invention.

Referring now to FIG. 1B, there is illustrated an exemplary alternative embodiment of the system 100, which exemplary alternative embodiment is generally designated as 100', in accordance with an exemplary embodiment of the present invention. The system 100' comprises all of the components of the system 100 and further comprises a network 140 of repeaters 145A, 145B, . . . , 145N. Each repeater 145 is also a network node. The repeaters 145A, 145B, . . . , 145N receive messages from transmitting nodes and retransmit them to other repeaters 145A, 145B, . . . , 145N or to receiving nodes.

Figure 2:
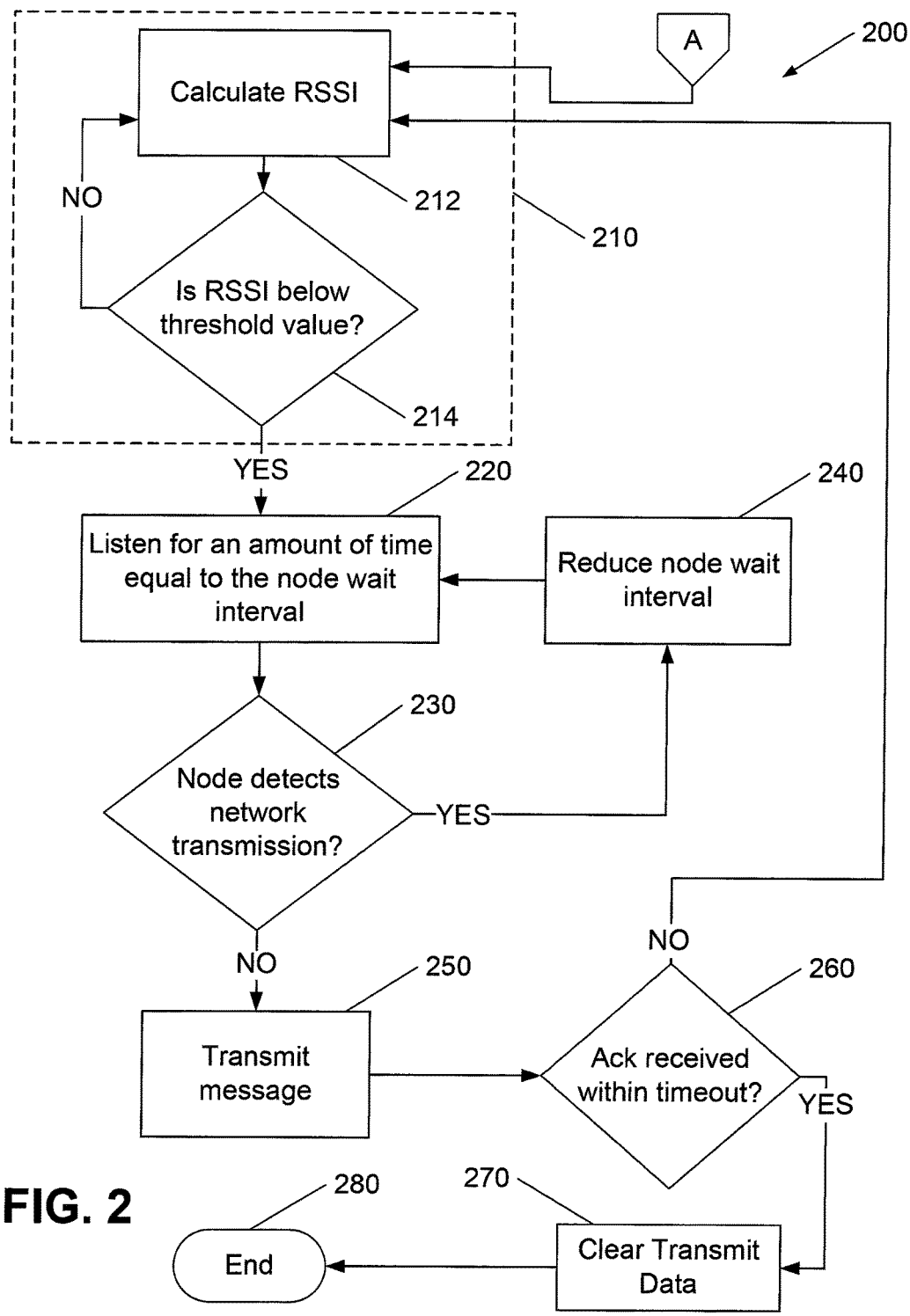
FIG. 2 illustrates a method for transmitting messages, in accordance with an exemplary embodiment of the present invention.

Referring now to FIG. 2, there is illustrated a method, generally designated as 200, for transmitting a message, in accordance with an exemplary embodiment of the present invention. Any node of the system 100 and any non-repeater node of the system 100' perform one exemplary embodiment of the method 200. Any repeater node of the system 100' performs another exemplary embodiment of the method 200. Repeater nodes and non-repeater nodes differ in their implementation of the Step 250 of the method 200, as described below. FIG. 2 is described with reference to FIGS. 1A and 1B. The method 200 is invoked at least once during the heartbeat interval by a transmitting node to send a heartbeat message. It is also invoked every time the OCU 110 or the LCU 120 receives changed data or changed control information to be transmitted. The method 200 establishes a CSMA topology in the system 100, 100'.

The method 200 begins with a Step 210 in which a network node, before attempting to send data, listens to the common RF channel for other transmitting nodes and waits for the channel to become free or available. The Step 210 comprises two sub-steps 212 and 214. In the sub-step 212, the node calculates a Received Signal Strength Indicator (RSSI) and continues to the sub-step 214. In the sub-step 214, the node determines whether the calculated RSSI is below a pre-configured threshold. If it is not, the node determines that the RF channel is not available, and the method 200 returns to the sub-step 212 where it waits for a predetermined amount of time before calculating the RSSI again. If it is, the RF channel is available, and the method 200 continues to a Step 220.

In the Step 220, the node continues to listen for a variable delay known as the node wait interval. The length of the node wait interval is inversely proportional to the node's transmission priority. The method 200 continues to a Step 230 in which the node listens for a network transmission. If the node detects a network transmission (signaled by detecting a valid preamble and sync word sequence) during this interval, the method 200 proceeds to a Step 240 in which the node increases the transmission priority, thus reducing the node wait interval. The method 200 then returns to the Step 220 and restarts the node wait interval at the end of the detected transmission. The minimum node wait interval is desirably greater than the time needed to transmit the preamble and sync word sequence to ensure detection of other network transmissions. The Steps 210 through 240 are a collision avoidance algorithm.

Otherwise, in the Step 230, if the node does not detect a network transmission during the node wait interval, the method 200 continues to a Step 250, in which the node transmits its message which is either the heartbeat message or a message comprising changed data and/or changed control information. In the exemplary embodiment in which the method 200 is being performed by a non-repeater node, the transmitting node assembles the message to be sent by inserting its ID, the receiving node's ID, any changed data, any changed control information, and the sequence number for the transmitted message. The transmitting node stores the sequence ID in a list of messages for which receipt is to be acknowledged (the "pending acknowledgement list"). In the instance in which there is no changed data or changed control information to be transmitted, the transmitting node omits the command payload from the message, thus making the message a heartbeat message. A heartbeat message is a message transmitted by the transmitting device to let the receiving device know that it is still communicating. In the exemplary embodiment in which the method 200 is being performed by a repeater node, the repeater node retransmits, in the Step 250, a message it has received. It does not maintain a pending acknowledgement list. In a Step 260, the transmitting node listens for an acknowledgement of receipt of the message by the receiving node. If an acknowledgement is received within a timeout interval, the method 200 proceeds to a Step 270 in which the transmitted data is cleared, and the method 200 ends, Step 280. Otherwise, if the transmitting node does not receive an acknowledgement of receipt within the timeout interval, the method 200 loops back to the Step 210, in which the transmitting node attempts to transmit a new message with the unacknowledged command payload data. The method 200 continues as discussed above.

In an exemplary embodiment, in the Step 220, while waiting to transmit a message, the node continues monitoring inputs for changed data or additional control information. If additional changed data or additional control information is detected during the node wait interval in the Step 220, the node may append the additional changed data and/or additional control information to the message to reduce the overall number of message transmissions.

Figure 3:
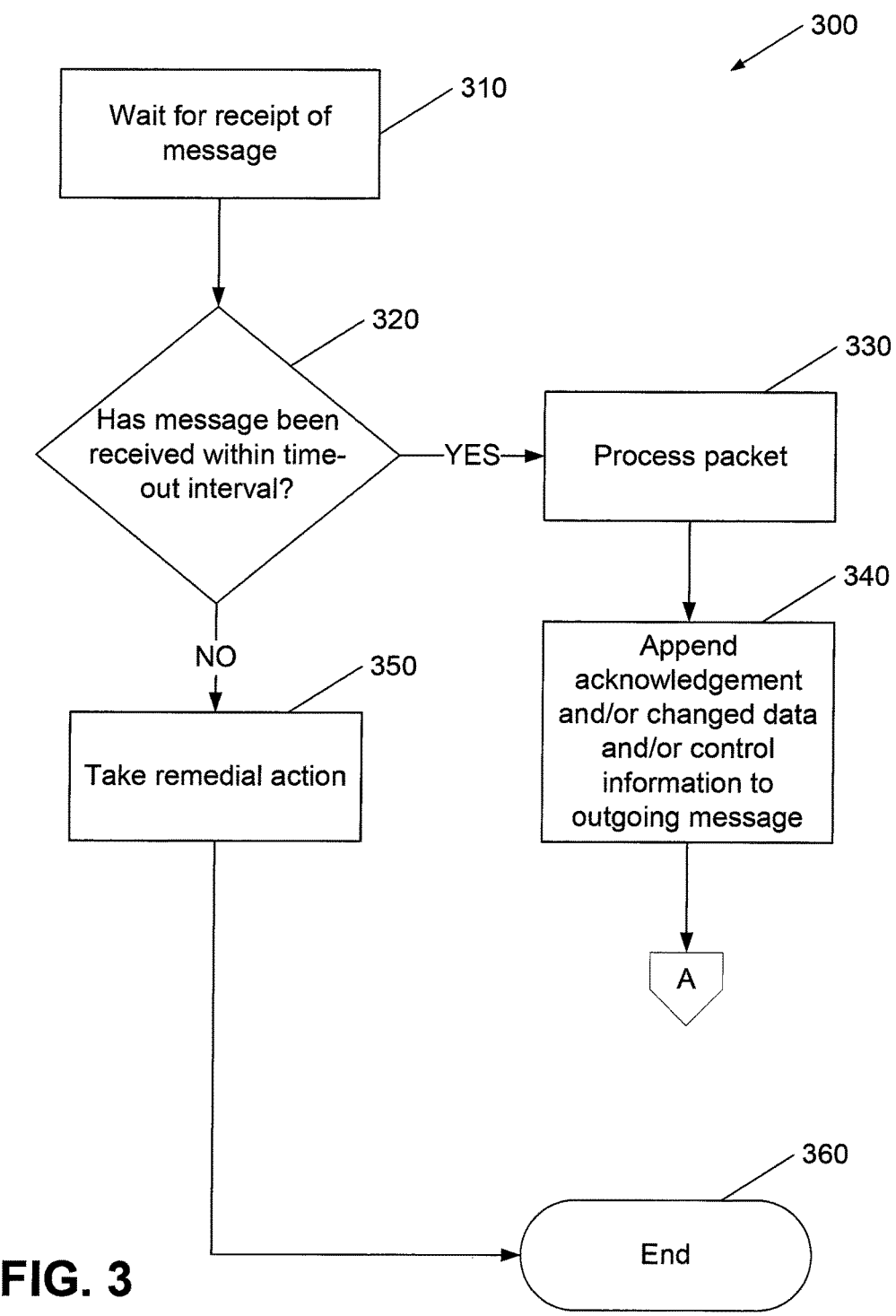
FIG. 3 illustrates a method for receiving messages, in accordance with an exemplary embodiment of the present invention.

Referring now to FIG. 3, there is illustrated a method, generally designated as 300, for receiving and processing messages, in accordance with an exemplary embodiment of the present invention. Each node in the system 100 and each non-repeater node in the system 100' performs the method 300. FIG. 3 is described with reference to FIGS. 1A and 1B.

The method 300 begins with a non-repeater node (hereinafter a "receiving node") waiting for receipt of a message, Step 310. While waiting, the receiving node determines whether it has received a message originating from a non-repeater transmitting node (hereinafter a "transmitting node") within a timeout interval, Step 320. If it has, the method 300 continues to a Step 330, in which the receiving node processes the received message. In an exemplary embodiment in which the receiving node is an OCU, the OCU displays any relevant data in the received message in the Step 330 and makes note of any acknowledgements in the received message. In an exemplary embodiment in which the receiving node is an LCU, the LCU executes any control information contained in the received message in the Step 330 and makes note of any acknowledgements in the received message.

Continuing with the method 300, in the Step 330, the receiving node processes any acknowledgements contained in the received message originating from a transmitting node. For any acknowledgement in the received message, the receiving node determines the sequence number for such acknowledgement and removes such sequence number from its pending acknowledgement list. The acknowledgement received by the receiving node is an acknowledgement of receipt of a message it previously sent as a transmitting node.

In the Step 330, the receiving node determines whether there are any sequence numbers in the pending acknowledgement list corresponding to a message which the receiving node previously transmitted (as a previous transmitting node) but for which it did not receive an acknowledgement within a predetermined time period. The receiving node removes any such sequence numbers from the pending acknowledgement list and queues up the unacknowledged message(s) data to be resent or appends it to a message waiting to be sent. The method 300 continues to a Step 340.

In the Step 340, the receiving node appends an acknowledgement of the received data and/or control information from the Step 310 to an outgoing message, Step 340. The receiving node also appends any unacknowledged message data from the Step 330 to an outgoing message. Since the transmitting node transmits only changed data or changed control information, packet acknowledgement by the receiving node is desirable to inform the transmitting node that it has received the message containing the changed data or changed control information. In an exemplary embodiment, the appended acknowledgement comprises the node ID (of the node performing the method 300) and the sequence number of the message received in the Step 310. From the Step 340, the method 300 proceeds to the Step 210 via jump "A" in FIG. 3 to transmit the outgoing message.

If the receiving node determines in the Step 320 that is has not received a message within the timeout interval, it proceeds to a Step 350, in which it takes remedial action. The method then ends in a Step 360.

In an exemplary embodiment, when no message has been received within the timeout interval, in the case in which the receiving node is an LCU, in the Step 350, the remedial action involves the LCU commanding the locomotive on which it is mounted to enter a safe state. The method 300 then ends, Step 360. Entering a safe state may entail throttling down to idle and applying brakes until the locomotive stops. In an exemplary embodiment, the timeout interval for the receiving node when it is an LCU is four seconds.

In another exemplary embodiment, when no message has been received within the timeout interval, in the case in which the receiving node is an OCU, in the Step 350, the remedial action involves the OCU indicating a loss of link with the LCU by activating an audible alarm, activating a display element, e.g., an LED indicator or an LCD display, in the OCU or activating both the audible alarm and the display element. The method 300 then ends, Step 360. The OCU then may perform the method 200 to send periodic commands in the Step 250 to attempt reconnection with the LCU, e.g., every six seconds. If the link with the LCU is re-established after subsequent execution of the method 300, the OCU clears the loss of link indicators in the Step 330 and resumes normal operation. In an exemplary embodiment, the timeout interval for the transmitting node when it is an OCU is two seconds.

In an exemplary embodiment, the receiving node may receive more than one data and/or command message in the Step 310 before expiration of the timeout interval in the Step 320. In such embodiment, the receiving node may acknowledge receipt of the more than one data and/or command messages in the Step 340 by appending acknowledgements for each received message to a single outgoing message transmitted in the Step 250. This allows the receiving node to acknowledge multiple incoming messages with a single outgoing message to reduce network congestion.

Repeater nodes implement a simplified embodiment of the method 300. They receive messages in the Step 310 and then proceed to the method 200 to retransmit the received message. Each repeater node keeps track of which OCU and LCU nodes are within range. OCU and LCU nodes that are within range are marked by the repeater node as being associated. The repeater node will transmit the received messages in the Step 250 of the method 200 if the receiving node is associated with the repeater node, i.e., within range. In an exemplary embodiment, the repeater adds a "Repeater Information" command to the command payload. This command is used to identify if the packet was received through a repeater or directly from an endpoint OCU or LCU. The "Repeater Information" command includes the ID of the repeater that originally received the packet as well as the ID of the repeater that last repeated the packet.

In case a node is within range of multiple repeaters, the repeaters keep track of which repeater received packets from a node with the highest signal strength. Specifically, all packets transmitted by each node 110, 120 are received by any repeater node 145 within range. Each repeater node 145 calculates the RSSI for the received packet and informs the other repeater nodes 145 of its calculated RSSI. The repeater node 145 calculating the highest RSSI for the received packet will hold association with the broadcasting node 110, 120. If multiple repeaters receive the packet with the same signal strength, the repeater 145 with the lowest ID number will hold association. In an exemplary embodiment, the repeater nodes 145 communicate their RSSI information with one another over a channel different from the channel over which the nodes 110, 120 communicate commands. In an exemplary embodiment, the nodes 110, 120 communicate commands and heartbeat messages at 452 MHz, and the repeater nodes 145 communicate the RSSI information with one another at 5.8 GHz. In a further exemplary embodiment, the repeater nodes 145 communicate the RSSI information at 5.8 GHz using IEEE 802.11. It is to be understood that the system 100 may use a frequency other than 452 MHz for communicating commands and heartbeat messages and a frequency other than 5.8 GHz for communicating RSSI information.

In an exemplary operational scenario, a railyard includes ten trains all operating at the same time in the same geographic location. In this example, there are ten LCUs 120, one mounted in each locomotive 130. There are also 20 OCUs 110. Thus, there are 30 non-repeater nodes that transmit and receive messages on the same RF channel. The LCUs 120 and OCUs 110 transmit using the method 200 and receive using the method 300.

Figure 4:
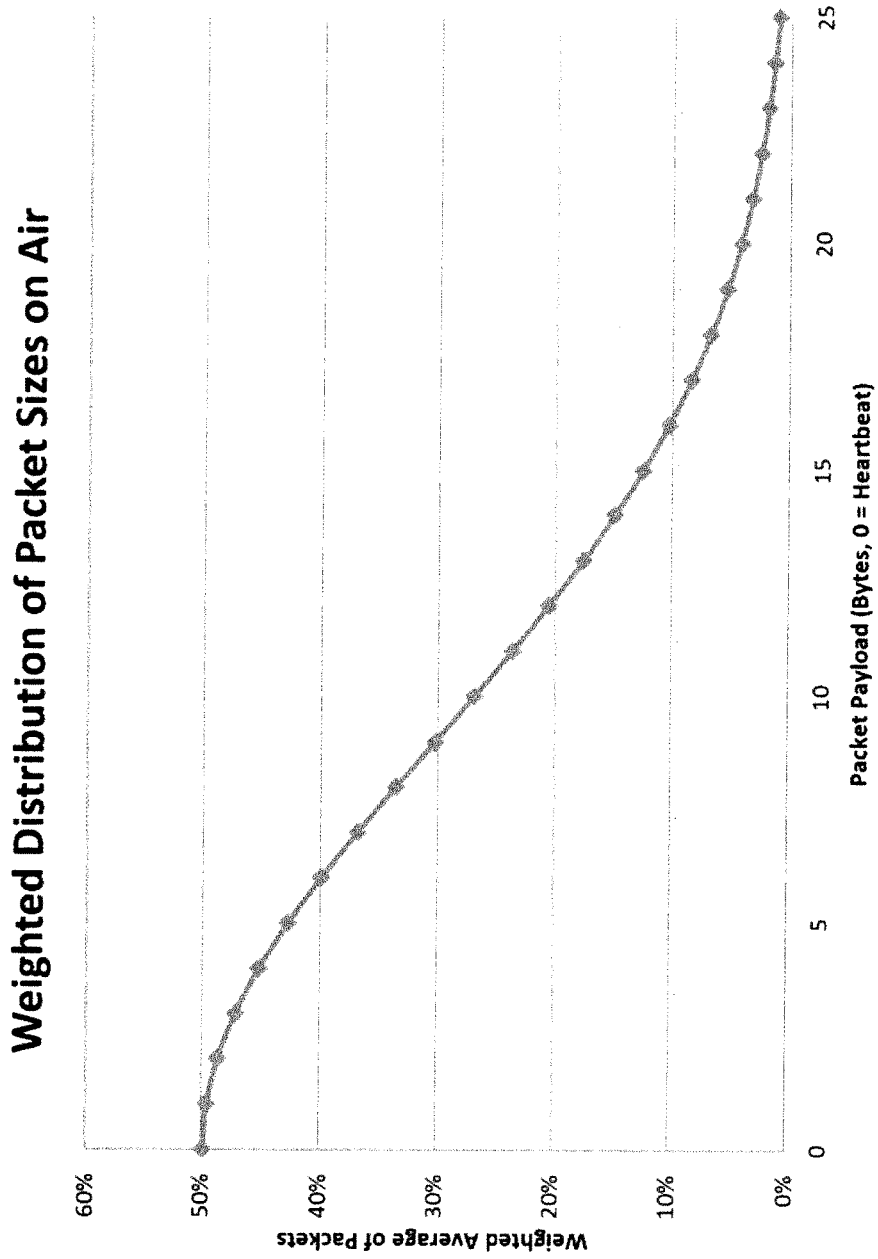
FIG. 4 illustrates an exemplary graph of an expected weighted average distribution of transmission time of the network of FIG. 1B, in accordance with an exemplary embodiment of the present invention.

In a typical operational scenario, the heartbeat message is the most frequently transmitted message. FIG. 4 illustrates an exemplary graph of an expected weighted average distribution of transmission time of the network 140 in this example. It can be seen from this graph that 50% of the messages that are sent through the network 140 are heartbeat messages. However, in a TDMA implementation, the timeslot length for all messages is the same, chosen to accommodate the longest message, e.g. (36 bytes plus 4 bits). Therefore, on average a TDMA system in which all time slots are used utilizes only 56% of the total available airtime for actual message data. The TDMA system requires time slot allocation for all nodes in the network. If the TDMA system can handle 20 nodes, there must be slots for 20 nodes, even if only 5 are running Scenarios in which not every time slot is used result in lower use of the total available airtime.

By contrast, in the system 100, 100', the message lengths are variable, which allows for the shortest and most frequently transmitted message (the heartbeat message having no command payload) to use the minimum time needed. As a result, the system 100, 100' can utilize up to nearly 100% of the total available messaging transmission time. Because of its short length, the methods 200 and 300 efficiently use available bandwidth to allow for a greater number of LCUs and OCUs to be used on the channel than if FDMA or TDMA had been used. Furthermore, in the system 100, 100', if only five nodes are online but the system 100, 100' may accommodate up to 20 nodes, the system 100, 100' can efficiently maximize usage of the air time the other nodes would have reserved in the TDMA structure because the offline nodes do not claim air time.

In the system 100, 100', there will be inevitable collisions when two or more nodes attempt to transmit their packets at the same time. The collision avoidance (CA) algorithm comprising the Steps 210 through 240 of the method 200 arbitrates these collisions on the RF channel). With CA employed on a network in which five of 20 possible nodes are operational, the system 100, 100' utilizes more of the total available messaging transmission time than a TDMA system.

Referring again to FIGS. 1A and 1B, each OCU 110A, 110B, . . . , 110N comprises a respective processing device 112A, 112B, . . . , 112N and a respective tangible computer-readable storage medium or storage device 114A, 114B, . . . , 114N in communication with the respective processing device 112A, 112B, . . . , 112N. Each LCU 120A, 120B, . . . , 120N comprises a respective processing device 122A, 122B, . . . , 122N and a respective tangible computer-readable storage medium or storage device 124A, 124B, . . . , 124N in communication with the respective processing device 122A, 122B, . . . , 122N.

For each OCU 110, its tangible computer-readable storage medium 114 may be any available computer storage medium that can be accessed by its processing device 112. Such computer storage medium includes both volatile and non-volatile and removable and non-removable media implemented in any method or technology for storage of information such as computer-readable software instructions, data structures, program modules, data received from the LCU 120 with which it communicates, control information inputted via the OCU 110, etc.

Each computer-readable storage medium 114 has software code stored thereon that, when executed by the respective processing device 112 of its OCU 110 causes the OCU 110 to perform any of the functionality of the OCU 110 described herein. Thus, any of the functionality performed by the OCU 110 described herein, such as the methods 200 and 300 described above, is implemented in software code or instructions which are tangibly stored on the computer-readable storage medium 114. Upon loading and executing such software code or instructions by the processing device 112, the OCU 110 may perform any of the functionality of the OCU 110 described herein, including any steps of the methods described above as being performed by the nodes of the system 100, 100'.

Each computer-readable storage medium 114 may include memory devices, such as magnetic media, optical media, magneto-optical media, and solid-state media. Magnetic media include magnetic cassettes, magnetic tape, magnetic disk storage (computer hard drive), or other magnetic storage devices. Optical media include optical discs, such as compact disc read-only memory (CDROM), digital versatile disks (DVD), or other optical disk storage. Magneto-optical media include magneto-optical drives. Solid-state memory includes random access memory (RAM), read-only memory (ROM), Electrically-Erasable Programmable Read-Only Memory (EEPROM), flash memory, or other memory technology.

For each LCU 120, its tangible computer-readable storage medium 124 may be any available computer storage medium that can be accessed by its processing device 122. Such computer storage medium includes both volatile and nonvolatile and removable and non-removable media implemented in any method or technology for storage of information such as computer-readable software instructions, data structures, program modules, control information received from the OCU 110, data received from the locomotive control system with which it communicates, etc.

Each computer-readable storage medium 124 has software code stored thereon that, when executed by the respective processing device 122 of its LCU 120 causes the LCU 120 to perform any of the functionality of the LCU 120 described herein. Thus, any of the functionality performed by the LCU 120 described herein, such as the methods 200 and 300 described above, is implemented in software code or instructions which are tangibly stored on the computer-readable storage medium 124. Upon loading and executing such software code or instructions by the processing device 122, the LCU 120 may perform any of the functionality of the LCU 120 described herein, including any steps of the methods described above as being performed by the nodes of the system 100, 100'.

Each computer-readable storage medium 124 may include any memory devices, such as magnetic media, optical media, magneto-optical media, and solid-state media. magnetic media include magnetic cassettes, magnetic tape, magnetic disk storage (computer hard drive), or other magnetic storage devices. Optical media include optical discs, such as compact disc read-only memory (CDROM), digital versatile disks (DVD), or other optical disk storage. Magneto-optical media include magneto-optical drives. Solid-state memory includes random access memory (RAM), read-only memory (ROM), Electrically-Erasable Programmable Read-Only Memory (EEPROM), flash memory, or other memory technology.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A system for controlling locomotives, the system comprising:
   a remote control unit (RCU) comprising a processing device and a computer-readable storage medium; and
   a locomotive control unit (LCU) comprising a processing device and a computer-readable storage medium, the LCU coupled to a locomotive control system of a locomotive for controlling the locomotive and acquiring data therefrom,
   wherein the RCU and the LCU are configured to:
   transmit variable-length messages over a network wherein multiple locomotives share a common radio-frequency channel, where the variable-length messages are transmitted outbound, from the RCU to the LCU, or inbound, from the LCU to the RCU, over the common radio-frequency channel in variable-length time slots having no minimal or fixed length, and where each transmitting RCU and LCU is configured to independently set a time slot length for a message to be transmitted therefrom based upon a length of the message to be transmitted, and is configured to transmit for a minimum duration necessary for the message to be transmitted;
   monitor the common radio-frequency channel for a transmission by a network node, whether the RCU or the LCU;
   wait for the common radio-frequency channel to become free; and
   transmit a message after the common radio-frequency channel has become free, wherein the time slot length of the message transmission is determined by a length of the message, and transmission of the message is for a minimum duration necessary for the message to be transmitted.

2. The system of claim 1, wherein the message comprises an identification of the RCU, an identification of the LCU, and a command identification.

3. The system of claim 1, wherein, because each transmitting network node is configured to independently set, on the common radio-frequency channel, the time slot for the message to be transmitted therefrom, and to transmit for the minimum duration necessary for the message to be transmitted, offline network nodes do not claim air time.

4. A system for controlling locomotives, the system comprising:
   a remote control unit (RCU) comprising a processing device and a computer-readable storage medium; and
   a locomotive control unit (LCU) comprising a processing device and a computer-readable storage medium, the LCU coupled to a locomotive control system of a locomotive for controlling the locomotive and acquiring data therefrom,
   wherein the LCU or RCU is configured to:
   monitor a common radio-frequency channel for a transmission by a network node,
   wait for the channel to become free, wherein the LCU or RCU is configured to:
   calculate a received signal strength indicator (RSSI), and
   compare the RS SI to a predetermined threshold; and
   transmit a message after the channel has become free;
   wherein, if the RS SI is not less than the predetermined threshold, the LCU or RCU is configured to:
   wait for an interval of time,
   monitor the channel for a network transmission,
   if a network transmission is detected during the interval of time, decrease the interval of time, and
   if a network transmission is not detected during the interval of time, transmit the message.

5. The system of claim 4, wherein the LCU or RCU is further configured to transmit the message if the RSSI is less than the predetermined threshold.

6. The system of claim 4, wherein the message comprises an identification of the RCU, an identification of the LCU, and a command identification.

7. A method for transmitting messages in a locomotive control network, the method including a system comprising:
   a remote control unit (RCU); and
   a locomotive control unit (LCU) coupled to a locomotive control system of a locomotive: the method comprising the steps of:
   transmitting variable-length messages over the network wherein multiple locomotives share a common radio-frequency channel, where the variable-length messages are transmitted outbound, from the RCU to the LCU, or inbound, from the LCU to the RCU, over the common radio-frequency channel in variable-length time slots having no minimal or fixed length, and where each transmitting RCU and LCU independently sets a time slot length for a message to be transmitted therefrom based upon a length of the message to be transmitted, and transmits the message in a minimum duration necessary;
   monitoring the common radio-frequency channel for a transmission by a network node, whether the network node is the RCE or the LCU;
   waiting for the common radio-frequency channel to become free, and
   transmitting a message after the common radio-frequency channel has become free, the message comprising data regarding a locomotive or at least one command for the locomotive, where the time slot length of the message transmission is determined by a length of the message, and transmission of the message is for a minimum duration necessary for the message to be transmitted.

8. The method of claim 7, further comprising a step of retransmitting command payload data of the message in a new message if an acknowledgement of receipt of the message has not been received.

9. The method of claim 7, wherein transmitting comprises transmitting a heartbeat message after the channel has become free, the heartbeat message indicating that a transmitter transmitting the heartbeat message is operational.

10. The method of claim 7, wherein, because each transmitting network node sets the time slot of the message to be transmitted therefrom, on the common radio-frequency network, whether inbound or outbound, and transmits for the minimum duration necessary for the message to be transmitted, offline network nodes do not claim air time.

11. A method for transmitting messages in a locomotive control network, the method comprising the steps of:
   monitoring a common radio-frequency channel for a transmission by a network node;
   waiting for the channel to become free, which comprises the steps of:
      calculating a received signal strength indicator (RSSI), comparing the RS SI to a predetermined threshold;
      determining the RS SI is not less than the predetermined threshold;
      waiting an interval of time;
      monitoring the channel for a network transmission;
      detecting that a network transmission occurred during the interval of time, then decreasing the interval of time;
      waiting the decreased interval of time; and
      detecting that a network transmission did not occur during the decreased interval of time; and
   transmitting a message after the channel has become free, the message comprising data regarding a locomotive or at least one command for the locomotive.

12. The method of claim 11, wherein the interval of time is inversely proportional to a transmission priority of the network node.

13. The method of claim 12, wherein the decreased interval of time is based upon an increase in transmission priority of the network node.

14. The method of claim 11, wherein, during the step of waiting for the interval of time, or during the step of waiting the decreased interval of time, further comprising the step of detecting changed data or detecting additional control information associated with a pending message, then appending the changed data or the additional control information to the pending message, thereby reducing an overall number of message transmissions.

15. A method for transmitting messages in a locomotive control network, the method comprising the steps of:
   monitoring a common radio-frequency channel for a transmission by a network node;
   waiting for the channel to become free; wherein waiting for the channel to become free comprises the steps of:
      calculating a received signal strength indicator (RS SI);
      determining the RS SI is not less than a predetermined threshold;
      waiting an initial interval of time, wherein the initial interval of time is inversely proportional to a transmission priority of the network node;
      monitoring the channel for a network transmission during the initial interval of time;
      detecting that a network transmission occurred during the initial interval of time, then increasing the transmission priority of the network node, thus decreasing the initial interval of time;
      waiting the decreased interval of time; and
      monitoring the channel for a network transmission during the decreased interval of time;
      detecting that a network transmission occurred during the decreased interval of time, then increasing again the transmission priority of the network node, thus further decreasing the decreased interval of time;
      waiting the further decreased interval of time; and
      detecting that a network transmission did not occur during the further decreased interval of time; and
      transmitting a message.

16. A method for transmitting messages in a locomotive control network, the method comprising the steps of:
   monitoring a common radio-frequency channel for a transmission by a network node;
   waiting for the channel to become free, and
   transmitting a message after the channel has become free, the message comprising data regarding a locomotive or at least one command for the locomotive;
   wherein waiting for the channel to become free comprises the steps of:
      waiting an interval of time, wherein the interval of time is inversely proportional to a transmission priority of the network node; and
      determining that a network transmission did not occur during the interval of time, whereby the channel is free.

17. A method for transmitting messages in a locomotive control network, the method comprising the steps of:
   monitoring a common radio-frequency channel for a transmission by a network node;
   waiting for the channel to become free, and
   transmitting a message after the channel has become free, the message comprising data regarding a locomotive or at least one command for the locomotive;
   wherein waiting for the channel to become free comprises the steps of:
      waiting an initial interval of time, wherein the initial interval of time is inversely proportional to a transmission priority of the network node;
      monitoring the channel for a network transmission during the initial interval of time;
      detecting that a network transmission occurred during the initial interval of time, then increasing the transmission priority of the network node, thus decreasing the initial interval of time;
      waiting the decreased interval of time; and
      monitoring the channel for a network transmission during the decreased interval of time;
      determining that a network transmission did not occur during the decreased interval of time, whereby the channel is free.

18. A method for transmitting messages in a locomotive control network, the method comprising the steps of:
   monitoring a common radio-frequency channel for a transmission by a network node;
   waiting for the channel to become free, and
   transmitting a message after the channel has become free, the message comprising data regarding a locomotive or at least one command for the locomotive;
   wherein, during the step of waiting for the channel to become free, further comprising the step of detecting changed payload data and detecting additional control information associated with a pending message, then appending the changed payload data and the additional control information to the pending message, thereby reducing an overall number of message transmissions.

19. A system for controlling locomotives, the system comprising:
   a remote control unit (RCU) comprising a processing device and a computer-readable storage medium; and
   a locomotive control unit (LCU) comprising a processing device and a computer-readable storage medium, the LCU coupled to a locomotive control system of a locomotive for controlling the locomotive and acquiring data therefrom, wherein the LCU or RCU is configured to:
monitor a common radio-frequency channel for a transmission by a network node;
wait for the channel to become free, and
transmit a message after the channel has become free, the message comprising data regarding a locomotive or at least one command for the locomotive;
wherein, to wait for the channel to become free, the LCU or RCU is configured to:
wait an interval of time, wherein the interval of time is inversely proportional to a transmission priority of the network node; and
determine that a network transmission did not occur during the interval of time, whereby the channel is free.

20. A system for controlling locomotives, the system comprising:
a remote control unit (RCU) comprising a processing device and a computer-readable storage medium; and
a locomotive control unit (LCU) comprising a processing device and a computer-readable storage medium, the LCU coupled to a locomotive control system of a locomotive for controlling the locomotive and acquiring data therefrom,
wherein the LCU or RCU is configured to:
monitor a common radio-frequency channel for a transmission by a network node;
wait for the channel to become free, and
transmit a message after the channel has become free, the message comprising data regarding a locomotive or at least one command for the locomotive;
wherein, to wait for the channel to become free, the LCU or RCU is configured to:
wait an initial interval of time, wherein the initial interval of time is inversely proportional to a transmission priority of the network node;
monitor the channel for a network transmission during the initial interval of time;
detect that a network transmission occurred during the initial interval of time, then increase the transmission priority of the network node, thus decreasing the initial interval of time;
wait the decreased interval of time; and
monitor the channel for a network transmission during the decreased interval of time;
determine that a network transmission did not occur during the decreased interval of time, whereby the channel is free.

21. A system for controlling locomotives, the system comprising:
a remote control unit (RCU) comprising a processing device and a computer-readable storage medium; and
a locomotive control unit (LCU) comprising a processing device and a computer-readable storage medium, the LCU coupled to a locomotive control system of a locomotive for controlling the locomotive and acquiring data therefrom,
wherein the LCU or RCU is configured to:
monitor a common radio-frequency channel for a transmission by a network node;
wait for the channel to become free; wherein the LCU or RCU is configured to detect changed payload data and to detect additional control information associated with a pending message, then to append the changed payload data and the additional control information to the pending message, thereby reducing an overall number of message transmissions; and
transmit a message after the channel has become free, the message comprising data regarding a locomotive or at least one command for the locomotive.

* * * * *